(Model.)
W. B. WHITE.
Metallic Joint for Wooden and Similar Structures.
No. 240,938.  Patented May 3, 1881.
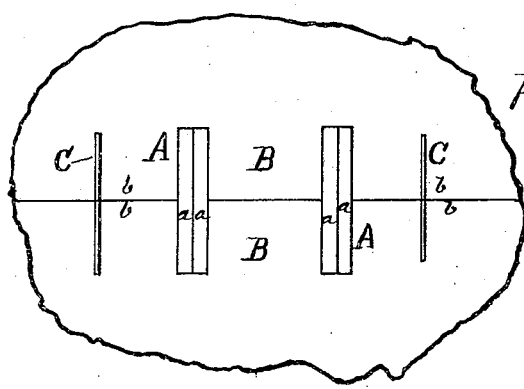
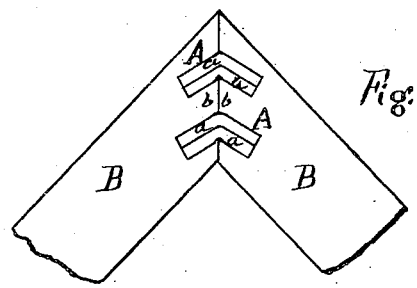
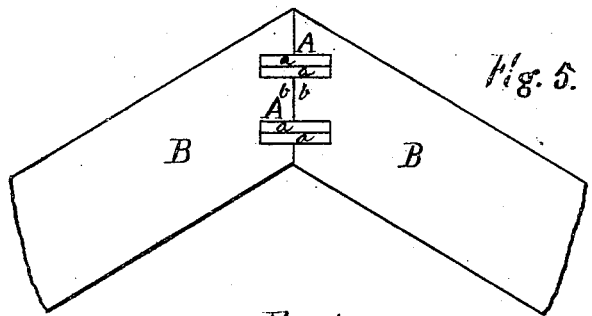
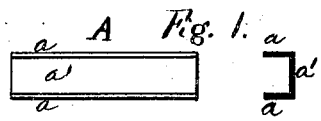
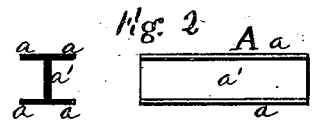
Witnesses,
J. S. McLeod
Edw. S. Cobb
Inventor,
Wm. B. White
by Jos. H. Adams
Atty.

UNITED STATES PATENT OFFICE.

WILLIAM B. WHITE, OF QUINCY, MASSACHUSETTS.

METALLIC JOINT FOR WOODEN AND SIMILAR STRUCTURES.

SPECIFICATION forming part of Letters Patent No. 240,938, dated May 3, 1881.

Application filed July 19, 1880. (Model.)

*To all whom it may concern:*

Be it known that I, WILLIAM B. WHITE, of Quincy, in the county of Norfolk and State of Massachusetts, have invented a new and useful Improvement in Metallic Joints for Wooden Articles, of which the following is a specification.

The object of my invention is to produce a device for joining together pieces of wood, pasteboard, or other material at their ends or edges, in the place of the ordinary tongue-and-groove joint, and without the use of glue or other adhesive substance.

The invention consists in connecting together two pieces of material designed to be permanently joined, such as pasteboard patterns, picture-frames, &c., by means of two short pieces of sheet metal, each having their sides, in the direction of their length, bent at right angles and inserted in slots cut in the edges of the two pieces of material to be joined together, the wide portions of the said sheet-metal pieces being in contact with each other in said slots, and the bent portions of each fitting flush upon the surfaces of the two pieces to be united.

My invention is illustrated in the accompanying drawings, in which Figure 1 represents a plan and end view of my device. Fig. 2 is a modification of the same. Fig. 3 shows two straight edges joined together, the metallic joint being at right angles with the joined edges of the material. Fig. 4 shows my device applied to a miter-joint, and Fig. 5 to a bevel-joint.

A, Fig. 1, is a piece of thin sheet metal, having its edges or sides *a a*, in the direction of its length, bent at right angles with the main portion *a'*, as shown.

B B are two pieces of wood or other material to be joined together. In fitting the device A to the pieces to be joined, a slot, C, Fig. 3, is first cut in the edges *b b* of the said material, and at right angles with the same. Two of the joints A are then inserted in the slots in each piece B B, the wide portions of the said joints A being placed in contact with each other, and their bent-over edges *a a* projecting in opposite directions and flush with the surfaces of each piece B, the portion *a' a'* of the joints A being of a width corresponding with the thickness of the pieces of material to be joined together.

Fig. 4 shows two pieces of material connected at a miter-joint, the metallic joints A being bent to conform more nearly to the grain of the wood, if found necessary.

Fig. 5 shows two pieces joined together with beveled edges.

Two joints or pieces, A, may be united together by soldering or otherwise, as shown in Fig. 2, so as to constitute a single piece, or the double joint A may be of thin malleable cast-iron. After the joints A are inserted in the slots of the two pieces B B to be joined together the bent edges are pressed down by a blow or other pressure, so as to make the said edges of even surface with the materials joined. The effect of the said pressure is to bend or curve the portion *a'* of the joint A within the slot, by means of which it is rendered very much stronger.

My invention is especially adapted to joining together pieces of pasteboard composing patterns for garments or other purposes, and for joining several pieces of large size from which patterns may be cut.

The edges of the bent-over sides of the joints A may be serrated, for the purpose of joining together pieces of leather.

What I claim as my invention is—

A metallic joint consisting of two pieces, A, of sheet metal, each having their edges in the direction of their length bent at right angles, and inserted in slots in the edges of the pieces of material to be united, and with their main portions *a' a'* in contact with each other, substantially as and for the purpose set forth.

In testimony whereof I have signed my name to this specification in the presence of two subscribing witnesses.

WM. B. WHITE.

Witnesses:
JOS. H. ADAMS,
EDW. S. COBB.